United States Patent
Brockschmidt et al.

(10) Patent No.: US 9,711,264 B2
(45) Date of Patent: Jul. 18, 2017

(54) WINDING LAYERS COMPOSED OF DIFFERENT MATERIALS

(71) Applicant: SIEMENS AKTIENGESELLSCHAFT, München (DE)

(72) Inventors: Mario Brockschmidt, Essen (DE); Peter Gröppel, Erlangen (DE); Friedhelm Pohlmann, Essen (DE); Claus Rohr, Mannheim (DE); Roland Röding, Ellrich (DE); Julia Wirsing, Scheinfeld (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/387,497

(22) PCT Filed: Mar. 14, 2013

(86) PCT No.: PCT/EP2013/055245
§ 371 (c)(1),
(2) Date: Sep. 23, 2014

(87) PCT Pub. No.: WO2013/143864
PCT Pub. Date: Oct. 3, 2013

(65) Prior Publication Data
US 2015/0115763 A1    Apr. 30, 2015

(30) Foreign Application Priority Data
Mar. 26, 2012 (EP) .................................. 12161152

(51) Int. Cl.
*H01B 17/44* (2006.01)
*H02K 3/40* (2006.01)

(52) U.S. Cl.
CPC ............... *H01B 17/44* (2013.01); *H02K 3/40* (2013.01)

(58) Field of Classification Search
CPC ........... H01B 17/44; H02K 3/40; H02K 41/02
(Continued)

(56) References Cited

U.S. PATENT DOCUMENTS 5,574,325 A    11/1996   von Musil et al. ........... 310/215
6,130,496 A *  10/2000   Takigawa ................. H02K 3/40
                                                        310/196

(Continued)

FOREIGN PATENT DOCUMENTS

CN    1070519 A    3/1993
CN    1240060 A    12/1999
(Continued)

OTHER PUBLICATIONS

International Search Report dated Apr. 18, 2013 issued in corresponding International patent application No. PCT/EP2013/055245.
(Continued)

*Primary Examiner* — Hoa C Nguyen
*Assistant Examiner* — Stanley Tso
(74) *Attorney, Agent, or Firm* — Ostrolenk Faber LLP (57) ABSTRACT

Fewer insulation layers can be used by virtue of using hydrophobic electrically conductive materials around a main insulation around a conductive bar. There are several more layers of conductive and/or non-conductive material.

10 Claims, 6 Drawing Sheets

(58) Field of Classification Search
USPC .................... 174/102 C, 84; 310/216.105
See application file for complete search history.

(56) References Cited

U.S. PATENT DOCUMENTS

| | | | |
|---|---|---|---|
| 2005/0244650 A1* | 11/2005 | Ren .................... | B29C 47/0004 428/421 |
| 2006/0005991 A1 | 1/2006 | Zamzow et al. ............. | 174/120 |
| 2009/0294556 A1* | 12/2009 | Bosch ................ | H01L 41/0533 239/584 |
| 2011/0062816 A1* | 3/2011 | Emery .................... | H02K 3/40 310/196 |
| 2012/0049127 A1* | 3/2012 | Ren .................... | B29C 47/0004 252/511 |

FOREIGN PATENT DOCUMENTS

| | | |
|---|---|---|
| CN | 1722579 A | 1/2006 |
| DE | 40 22 476 A1 | 1/1992 |
| EP | 0 978 926 A1 | 2/2000 |
| EP | 1 617 544 A1 | 1/2006 |
| EP | 1 903 662 A1 | 3/2008 |
| JP | 2000-060047 | 2/2000 |
| WO | WO 2009/081430 A2 | 7/2009 |

OTHER PUBLICATIONS

Written Opinion dated Apr. 18 2013 issued in corresponding International patent application No. PCT/EP2013/055245.
Examination Report mailed Sep. 30, 2015 in corresponding European Patent Application No. 13 712 510.0.
Examination Report mailed Oct. 26, 2015 in corresponding European Patent Application No. 13 712 510.0.
Anonymous, "Mica—Wikipedia, the free encyclopedia," URL: https://en.wikipedia.org/wiki/Mica, downloaded Oct. 14, 2015, 9 pages.
Chinese Office Action issued Feb. 29, 2016 in corresponding Chinese Patent Application No. 201380017069.9, along with an English translation of relevant portions thereof.

* cited by examiner

WINDING LAYERS COMPOSED OF DIFFERENT MATERIALS

CROSS-REFERENCE TO RELATED APPLICATIONS

The present application is a 35 U.S.C. §§371 National Phase conversion of PCT/EP2013/055245, filed Mar. 14, 2013, which claims priority of European Patent Application No. 12161152.9, filed Mar. 26, 2012, the contents of which are incorporated by reference herein. The PCT International Application was published in the German language.

TECHNICAL FIELD

The invention relates to winding layers composed of different materials.

TECHNICAL BACKGROUND

Electrical potential control makes it possible in rotating machines, such as for example generators or high-voltage motors, to minimize electrical voltages (potential differences), thereby allowing the occurrence of partial and/or corona discharges to be reduced or avoided entirely.

In rotating electrical machines, the reliability of the insulating system is decisively responsible for their operational reliability. The insulating system has the task of permanently insulating electrical conductors (wires, coils, bars) from one another and from the laminated stator core or the surroundings. Outer potential control has the task of making electrical contact between the laminated stator core at ground potential and the outer side of the main insulation. This ensures that no partial discharges occur in voids in the region of the boundary layer of the insulation and the laminated core.

A distinction must be made here between
- outer corona protection (OCP) for generator winding bars that have been produced by single bar production (OCP-S) and
- outer corona protection (OCP) for generator winding bars that have been produced by means of the GVPI process (OCP-G).

In the case of globally impregnated stator windings (Global Vacuum Pressure Impregnation GVPI), the entire laminated core with a fully fitted winding is impregnated and cured altogether. As a result, the adhesive bonding of the winding in the slots of the laminated core is so strong that the different coefficients of expansion of the copper, iron and insulation lead to high thermomechanical stresses between the copper, insulation and iron, which after a certain number of thermal cycles (starts and stops of the generator) may lead to tearing open of the boundary surfaces. In order to prevent the gaps from being subject to a difference in electrical potential, and the partial discharges igniting there from destroying the insulation, an outer potential control (outer corona protection, OCP) is used, in the prior art represented in FIG. 20 as a double-layered outer corona protection, such as is used for the potential control of machines processed by means of G-VPI.

Figure 20:
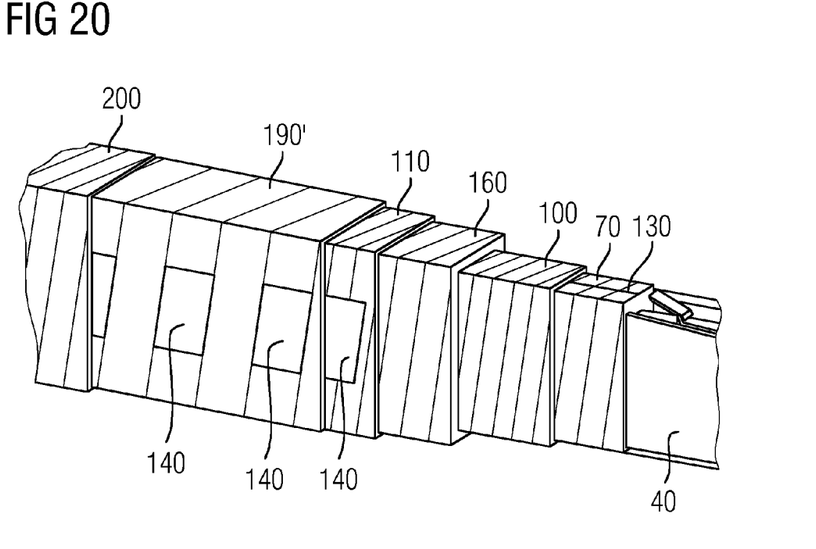
FIG. 20 shows an outer corona protection as known in the art.

An insulating base winding 70 of fine-mica tape is applied over the current-carrying Roebel bar of copper conductor elements 40, smoothing and increasing the edge radii of the thin copper conductor elements 40.

Wound thereover is a first graphite-containing conductive nonwoven tape 100, which is only connected at one point to the high-voltage potential of the copper conductor element 40 by way of a contact strip 130.

It is only thereupon that the main insulation 160 of fine-mica glass is wound. Instead of the copper conductor elements, the first conductive nonwoven tape 100 thus forms the high-voltage electrode. It is permanently adhesively bonded to the main insulation 160.

Following on top of the main insulation 160 is the inner outer corona protection winding 110 according to the prior art, an outermost separating tape 190' and an outer outer corona protection winding 200. An outer corona protection tape 140, which is woven in the outermost separating tape 190', connects the inner outer corona protection winding 110 and the outer outer corona protection winding 200.

The thermomechanical stresses occurring between the copper conductor assembly and the insulation during the starting and stopping of the generator may after a certain operating time lead to local detachments of the insulating sheath from the conductor, without the feared partial discharges igniting in the gaps that are produced. The region of the delamination is potential-free, because the high-voltage potential has been transferred to the conductive nonwoven tape that becomes baked fast on the main insulation. This IPC design at the highly stressed inner boundary layer between the conductor and the insulation allows turbogenerators to be operated at peak load for decades without any notable partial discharge aging.

The object of the invention is therefore to solve the aforementioned problems.

The object is achieved by an insulation system according to, with an outer corona protection according to the invention and an electrical machine according to the invention.

DESCRIPTION OF EMBODIMENTS

The figures and the description only represent exemplary embodiments of the invention.

Figure 1:
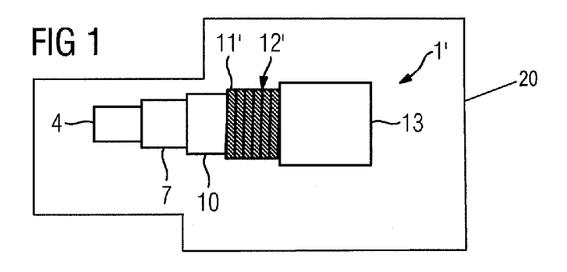
FIGS. 1 to 19 show various windings.

FIG. 1 shows an insulation 1' around a metallic bar 4, which has a main insulation 7 (not represented any more specifically), including inner potential control (IPC) around the metallic bar 4 (or metallic material).

Figure 2:
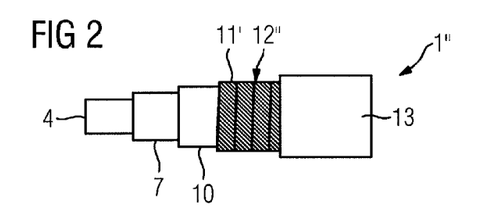
Figure 3:
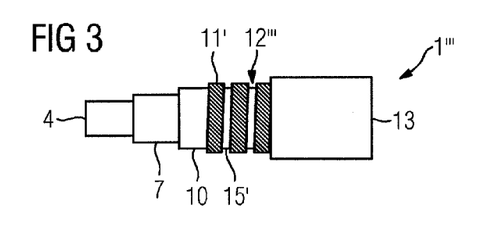

The main insulation 7 has preferably been applied directly to the metallic bar 4 (FIGS. 1, 2 and 3).

The main insulation 7 is preferably wound and preferably comprises mica or some other known material for the insulation.

On the main insulation 7 there is a further layer 10 of a well-adhering, electrically conductive material (preferably from the Krempel company) of the prior art. The insulation 1' is included in a generator 20 or other rotating electrical machine.

Wound up on this layer 10 is an electrically conductive, hydrophobic tape 11' as the layer 12', the tapes 11' overlapping.

The material of the tape 11' therefore differs significantly from the materials of the layers 7, 10 and 13.

On this layer 12' there is in turn a well-adhering, conductive winding tape for the formation of the outermost layer 13 (FIGS. 1, 2 and 3), which may comprise the same material as the layer 10.

As a difference from FIG. 1, depicted in FIG. 2 is a further variant 1" of the insulation system, in which the tapes 11' abut one another, i.e. do not overlap in the layer 12" thus formed.

The materials for the layer 12" are preferably identical to the layer 12'.

Shown in FIG. 3 is a further variant 1''' of the insulation system, in which, on the basis of FIG. 2, the tapes 11' have a clearance or spacing 15' between one another and form the layer 12'''.

The materials of the layers 12" and 12''' are preferably identical.

Figure 4:
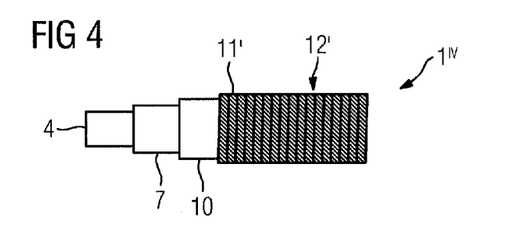
Figure 5:
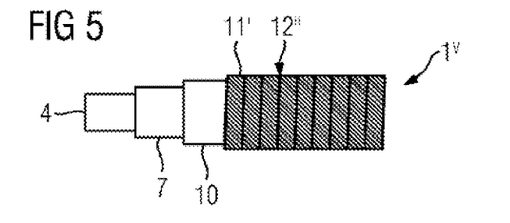
Figure 6:
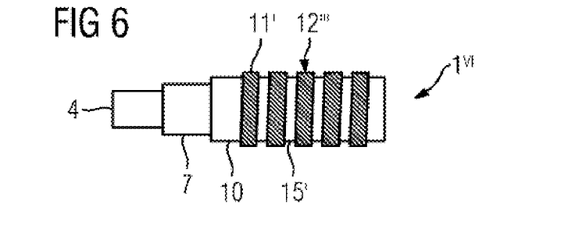

Shown in FIG. 4 is a further insulation $1^{IV}$, in which there is around the metallic bar 4 a main insulation 7 with an adhering, electrically conductive material and a further layer 10 and also a tape 11' in an overlapping manner of the layer 12' or only abutting (FIG. 5, layer 12", insulation $1^V$) or with a clearance 15' in between (FIG. 6, layer 12''', insulation $1^{VI}$). This corresponds to the exemplary embodiments according to FIGS. 1 to 3, but without the outer layer 13, so that the electrically conductive, hydrophobic material (layer 12', 12", 12''') forms the outermost layer.

Figure 7:
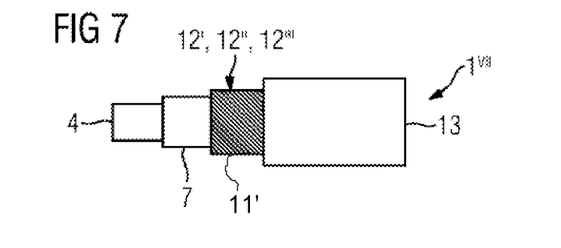

In FIG. 7, a further variant of an insulation $1^{VII}$ is shown. The main insulation 7 has preferably been applied directly to the metallic bar 4.

In the case of this variant $1^{VII}$, directly on the main insulation 7 there is electrically conductive, hydrophobic material of the tape 11', which forms the layer 12', 12" or 12''', around which there is a well-adhering, electrically conductive and preferably outermost layer 13. This corresponds to FIGS. 1, 2 and 3 without the intermediate layer 10.

Figure 8:
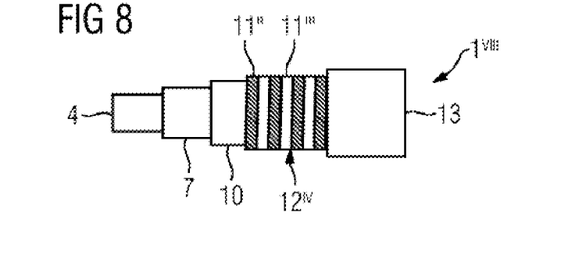
Figure 9:
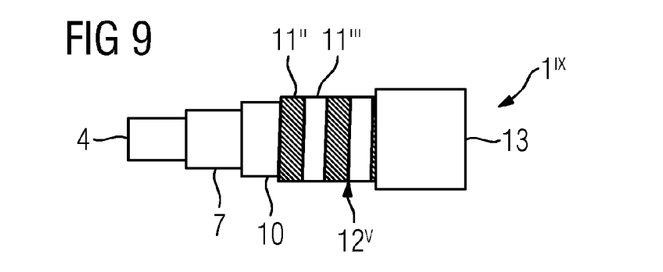
Figure 10:
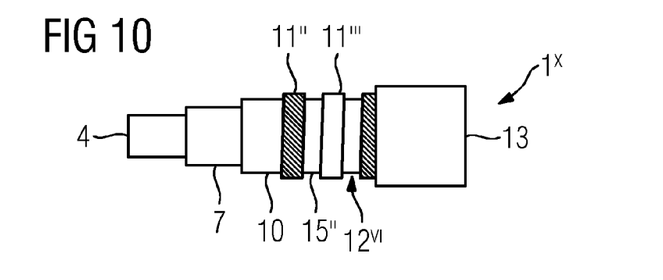

FIGS. 8 to 10 show further variants of the insulation system $1^{VIII}$ to $1^X$.

The main insulation 7 has preferably been applied directly to the metallic bar 4 (FIGS. 8, 9 and 10) and similarly the layer 13 is preferably the outermost layer (FIGS. 8, 9 and 10).

The starting point in the case of FIGS. 8, 9 and 10 is in each case a metallic bar 4, on which there is a main insulation 7 and a well-adhering, electrically conductive material directly thereupon as the layer 10.

Arranged in an overlapping manner on this layer 10 there is according to FIG. 8 in a layer $12^{IV}$ both a tape 11''' of well-adhering, electrically conductive material and a tape 11" (corresponds to tape 11' (FIGS. 1-7)) of an electrically conductive, hydrophobic material. The tapes 11", 11''' overlap.

According to the embodiments of layer 12" in FIG. 9, on the basis of FIG. 8, the edges of the two different tapes 11", 11''' abut one another.

The two tapes (11", 11''') may form one tape, i.e. they have a left-hand edge as one half of electrically conductive, well-adhering material and a right-hand edge as the other half of an electrically conductive, hydrophobic material.

Similarly, the two tapes 11", 11''' with the different materials may be arranged at a spacing 15" from one another (FIG. 10).

Figure 11:
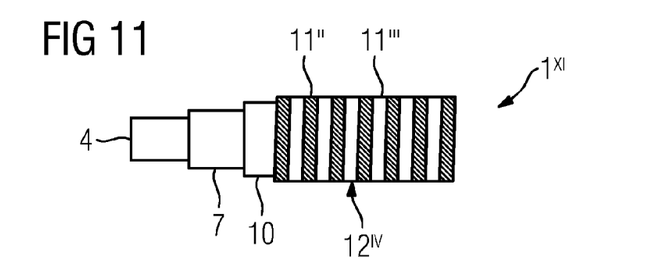
Figure 12:
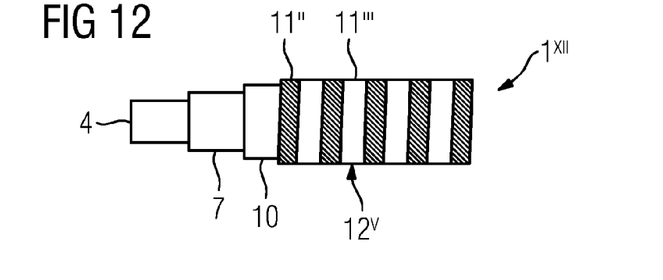
Figure 13:
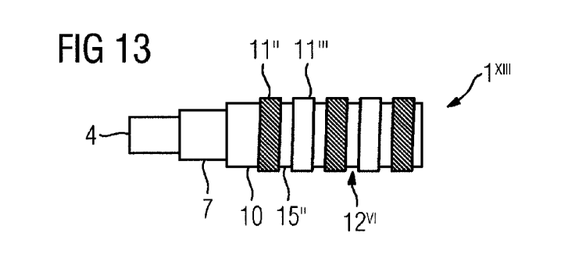

In FIGS. 11, 12 and 13, further variants of an insulation system $1^{XI}$ to $1^{XIII}$ are represented.

The main insulation 7 has preferably been applied directly to the metallic bar 4.

On the basis of FIGS. 8 to 10, here it is just that there is no outer layer 13, i.e. the electrically conductive, hydrophobic material (11", . . . ) forms the outermost layer.

The materials are preferably identical to those of FIGS. 8-10.

Figure 14:
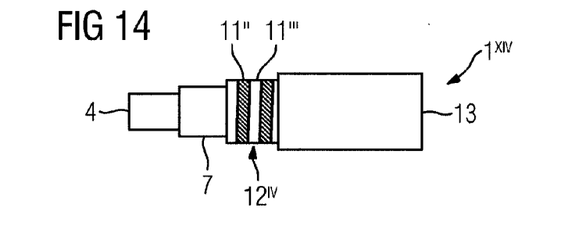

Shown in FIG. 14 is a further variant of an insulation system $1^{XIV}$, two tapes 11", 11''' respectively of well-adhering, conductive material 11''' and electrically conductive, hydrophobic material 11" being wound up in an overlapping manner on the main insulation 7.

As the outermost layer 13, there is a material of a well-adhering, conductive material.

Figure 15:
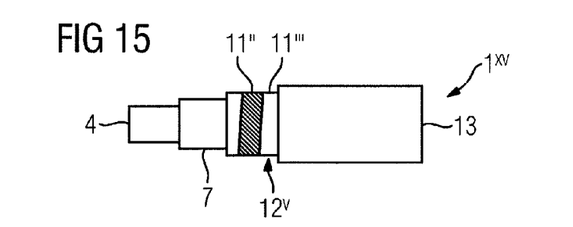
Figure 16:
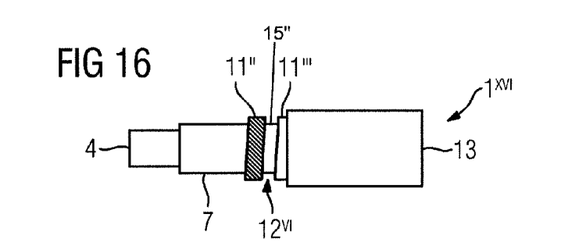

In the variant $1^{XV}$ according to FIG. 15, the various tapes 11''', 11" are present, abutting one another with their edges or with a clearance 15" between one another (FIG. 16).

FIGS. 14 to 16 respectively correspond to FIGS. 11 to 13, without the insulation 10 on the main insulation 7, but with an outer layer 13, i.e. the electrically conductive, hydrophobic material does not form the outermost layer.

The main insulation 7 has preferably been applied directly to the metallic bar 4 (FIGS. 14, 15 and 16).

Figure 17:
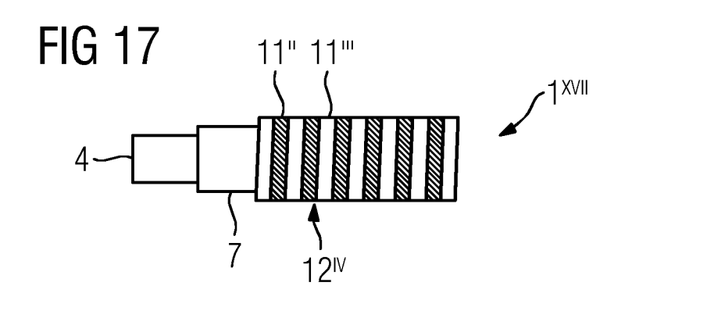
Figure 18:
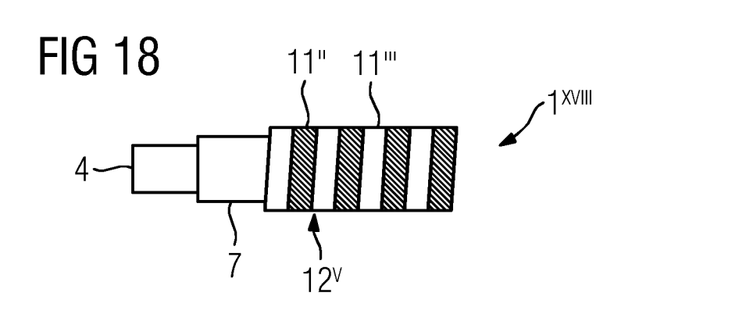
Figure 19:
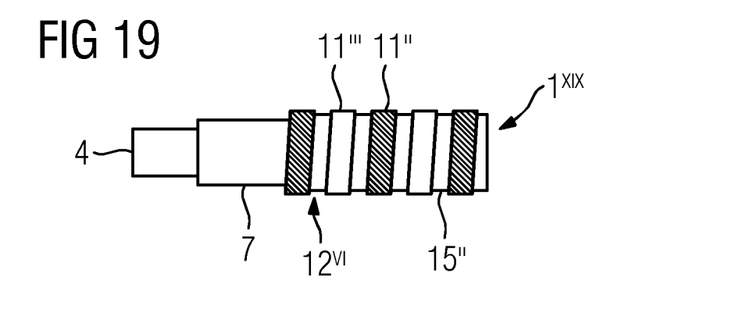

FIGS. 17, 18 and 19 show further variants $1^{XVII}$ to $1^{XIX}$, in which, on the basis of FIGS. 14 to 16, there is no outer material 13 of a well-adhering, conductive material, i.e. the electrically conductive, hydrophobic material forms the outermost layer.

The materials are preferably identical.

The main insulation 7 has preferably been applied directly to the metallic bar 4 (FIGS. 17, 18 and 19).

The selection of the number of layers 10, 12, 13 or the addition of the outermost layer 13 and/or an inner layer 10 with a material of the prior art depends on the area of use of the insulation, to be specific on the voltage used (more layers may be provided) and on the outer surroundings (choice of outermost layer).

The invention comprises using a hydrophobic material, in particular PTFE (polytetrafluoroethylene) for the insulation systems 1', . . . , $1^{XIX}$, in the layers 12'-$12^{VI}$, in particular as outer corona protection, most particularly for such a high-voltage insulation system, the outer corona protection being composed electrically conductively in the form of layers.

The high-voltage insulation system may be a simple system or a more complex system as in FIG. 20.

The invention is only explained on the basis of PTFE as an example of a hydrophobic material.

Preferably, the hydrophobic material or PTFE will already be composed electrically conductively. The PTFE is then a composite material.

This preferably takes place during the production of the material by means of mixing in graphite in particular, by means of extrusion during the production, with fibers then preferably being produced. However, subsequent electrical coating of a woven fabric, a fiber, a laid scrim or a film is also possible.

The woven fabric is preferably formed from such fibers.

This woven fabric is preferably present in tape form and for the application is wound onto the surface to be insulated (see FIG. 20).

Preferably, therefore, the outer corona protection comprises fibers or a woven fabric of PTFE, with electrically conductive material, preferably graphite, preferably also being present between the fabric-forming structures to achieve the electrical conductivity.

Similarly, the tape (woven fabric, fiber, film, laid scrim) may be perforated.

The insulation according to FIGS. 1 to 19 preferably has for the outer corona protection a woven fabric of PTFE, this being structurally designed in such a way that the fabric has pores that can be infiltrated as above by the process described.

This yields the following advantages:
  Good impregnatability, since it is a porous woven fabric and can consequently be applied before the curing.
  Unchanged resistance before and after the impregnation, since the conductivity is attributable to fibers and not to particles as in the case of OCP tape. (These have a different resistance value in comparison with the initial value on account of the polymer matrix enveloping the particles after the impregnation).

The objectives for OCP-G are:
simplified application/cost reduction
reduced layer thickness of the double OCP by a thinner alternative The approach for OCP-G is:
To reduce the layer thickness by using a separating layer, which provides a defined mechanical decoupling without causing the electrical resistance to change. This is intended to be accomplished by replacing the double layer of laminated mica with hydrophobic types of woven fabric. This may in particular be a Teflon fabric.

The structure is made up in the following way:
An improvement is obtained according to the invention by the use of electrically conductive woven fabric 190 of PTFE, since this makes the "interweaving" of the outer corona protection tape 140 (FIG. 20) unnecessary, and as a result would make it possible to reduce the layer thickness and the production complexity (FIG. 20).

The structure according to the invention of an innovative outer potential control for use in the GVPI process makes possible an insulation system that corresponds in its properties to the current state of the art but has the benefits of:
establishing freedom from partial discharges after curing
comparable loss factors after carrying out thermal cycling tests for accelerated thermomechanical loading
comparable electrical endurances under operational voltage loading and with increased voltage loading
comparable electrical endurances under operational voltage loading and with increased voltage loading after artificial aging in different thermal cycles.

These investigations were carried out on generator winding bars with the following design:
aluminum profiles with a length of about 1.5 m and dimensions of 1 cm×5 cm
number of layers of mica 10+1 layer of IPC for a nominal voltage of 13.8 kV
number of generator winding bars per collective: 6.

In this case, a reduction of the layer thickness of the current OCP of about 450 µm to a value of about 100 µm was made possible.

The invention claimed is:

1. An insulation system comprising:
a metallic bar;
a main insulation around the bar;
a single first layer of a single tape of composite material comprising at least one first electrically conductive material and at least one hydrophobic material wrapped around the main insulation, a second layer of a different second electrically conductive material directly on the main insulation, and a third outermost layer of an electrically conductive material; and
a fourth layer, between the first layer with the at least one first electrically conductive material and the at least one hydrophobic material and the main insulation, of an electrically conductive material, which is different from the at least one first electrically conductive material,
wherein the electrically conductive materials of the second and third layers are different from the at least one first electrically conductive material,
wherein the first layer is between the second layer and the third layer,
wherein the single first tape comprises a woven fabric comprising fibers, each fiber comprising graphite and PTFE,
wherein the single tape is one of one or more tapes wrapped around the main insulation, and
wherein the tapes are in a form of a succession of windings, each winding having edges, and the edges of successive windings of the tapes abut each other.

2. The insulation system as claimed in claim 1, wherein the main insulation comprises mica.

3. An electrical machine, which includes an insulation system as claimed in claim 1.

4. The electrical machine of claim 3, which comprises a generator.

5. The insulation system as claimed in claim 1, wherein the electrically conductive materials of the second layer and the third layer are the same.

6. An insulation system comprising:
a metallic bar;
a main insulation around the bar;
at least one first layer, each first layer being a single layer of a single tape of composite material comprising at least one first electrically conductive material and at least one hydrophobic material, the single tape being wrapped around the main insulation and a second layer of a different second electrically conductive material directly on the main insulation;
a third layer which consists of an electrically conductive material, the third layer being the outermost layer; and
a fourth layer, between the first layer with the at least one first electrically conductive material and the at least one hydrophobic material and the main insulation, of an electrically conductive material, which is different from the at least one first electrically conductive material,
wherein the at least one first layer is between the second layer and the third layer,
wherein the single first tape comprises a woven fabric comprising fibers, each fiber comprising graphite and PTFE,
wherein the single tape is one of one or more tapes wrapped around the main insulation, and
wherein the tapes are in a form of a succession of windings, each winding having edges, and the edges of successive windings of the tapes abut each other.

7. The insulation system as claimed in claim 6, which has the main insulation and only three layers selected from the group consisting of: the at least one first layer, the second layer, and the third layer.

8. The insulation system as claimed in claim 6, which has the main insulation and only two layers selected from the group consisting of: the at least one first layer and the second layer.

9. The insulation system as claimed in claim 6, which has one first layer.

10. The insulation system as claimed in claim 6, wherein the electrically conductive materials of the second layer and the third layer are the same.

* * * * *